United States Patent
Kohno et al.

(10) Patent No.: US 7,889,380 B2
(45) Date of Patent: Feb. 15, 2011

(54) PRINTING APPARATUS AND CONTROL METHOD THEREFOR

(75) Inventors: Tetsushi Kohno, Tokyo (JP); Masaya Kikuta, Kanagawa (JP); Norio Shimura, Kanagawa (JP); Takeaki Nakano, Tokyo (JP); Hirokazu Kameda, Kanagawa (JP); Masaaki Endo, Tokyo (JP); Shigehi Abe, Tokyo (JP); Manabu Kuchiki, Kanagawa (JP); Masanori Echigo, Kanagawa (JP); Munetaka Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1154 days.

(21) Appl. No.: 10/641,194

(22) Filed: Aug. 13, 2003

(65) Prior Publication Data

US 2004/0032613 A1    Feb. 19, 2004

(30) Foreign Application Priority Data

Aug. 14, 2002  (JP)  ............... 2002-236441

(51) Int. Cl.
*G06K 15/00* (2006.01)
*G03G 15/20* (2006.01)

(52) U.S. Cl. ............... 358/1.18; 358/1.9; 358/2.1; 358/1.13; 358/1.14; 358/1.15; 358/418; 358/419; 358/420; 358/421; 358/422; 358/423; 399/70; 399/36; 399/37; 399/43; 399/88; 399/114; 399/189; 399/208; 347/163; 347/167; 347/168; 347/29; 347/57

(58) Field of Classification Search .............. 358/1.14, 358/1.1, 1.5, 1.9, 3.2, 1.18, 502, 508, 2.1, 358/1.15, 419, 421, 422, 423; 400/652, 279; 235/60.24; 396/551; 101/35; 347/1, 5, 167, 347/145, 160, 168, 163, 29, 57, 132, 128; 399/70, 67, 69, 33, 45, 68, 320, 330, 331, 399/328, 36, 37, 43, 88, 114, 189, 396

See application file for complete search history.

(56) References Cited

U.S. PATENT DOCUMENTS 4,313,124 A    1/1982   Hara (Continued)

FOREIGN PATENT DOCUMENTS

JP    54-56847    5/1979

(Continued)

OTHER PUBLICATIONS

Japanese Office Action dated Jun. 9, 2008 on a corresponding counterpart Japanese Application No. 2002-236441.

*Primary Examiner*—Edward L Coles
*Assistant Examiner*—Steven Kau
(74) *Attorney, Agent, or Firm*—Fitzpatrick, Cella, Harper & Scinto

(57) ABSTRACT

When the time period is night, processing advances to step S13 to set the initialization speed of a line feed motor to the first speed (v1), and to step S15 to execute initialization operation of the line feed motor at the first speed (v1). When the time period is morning or daytime, the processing advances to step S12 to detect a cover open/closed state. When the cover is open, the processing advances to step S13 to set the initialization speed of the line feed motor to the first speed (v1). When the cover is closed, the processing advances to step S14 to set the initialization speed of the line feed motor to the second speed (v2) which is higher than the first speed (v1). The processing advances to step S15 to execute initialization operation of the line feed motor at the second speed (v2).

7 Claims, 6 Drawing Sheets

U.S. PATENT DOCUMENTS

| | | | |
|---|---|---|---|
| 4,345,262 A | | 8/1982 | Shirato et al. |
| 4,459,600 A | | 7/1984 | Sato et al. |
| 4,463,359 A | | 7/1984 | Ayata et al. |
| 4,522,483 A | * | 6/1985 | Matsumoto et al. ......... 399/167 |
| 4,558,333 A | | 12/1985 | Sugitani et al. |
| 4,723,129 A | | 2/1988 | Endo et al. |
| 4,740,796 A | | 4/1988 | Endo et al. |
| 5,317,668 A | * | 5/1994 | Kobayashi .................. 388/811 |
| 5,457,373 A | * | 10/1995 | Heppe et al. ................ 318/772 |
| RE35,319 E | * | 8/1996 | Yamada et al. .............. 400/605 |
| 5,758,228 A | * | 5/1998 | Hirose et al. ................. 399/70 |
| 5,793,177 A | * | 8/1998 | Chia ......................... 318/685 |
| 5,809,369 A | * | 9/1998 | Furuya et al. ................ 399/70 |
| 6,032,867 A | * | 3/2000 | Dushane et al. ............... 236/51 |
| 2002/0085714 A1 | * | 7/2002 | Inoha et al. ................. 380/201 |

FOREIGN PATENT DOCUMENTS

| | | | |
|---|---|---|---|
| JP | 59-123670 | | 7/1984 |
| JP | 59-138461 | | 8/1984 |
| JP | 60-71260 | | 4/1985 |
| JP | 02080275 | * | 3/1990 |
| JP | 04-041279 | | 2/1992 |
| JP | 11-039109 | * | 12/1999 |
| JP | 2000-099214 | | 4/2000 |
| JP | 2000-151906 | | 5/2000 |

* cited by examiner

PRINTING APPARATUS AND CONTROL METHOD THEREFOR

FIELD OF THE INVENTION

The present invention relates to a printing apparatus which executes initialization processing upon power-on, and a control method therefor.

BACKGROUND OF THE INVENTION

In a conventional printing apparatus such as a printer, a movable element such as a motor is initialized at the same initialization speed in initialization processing upon power-on regardless of the cover open/closed state of the printing apparatus or the use time period of the printing apparatus.

The operating noise of the movable element is different between the cover open state and the cover closed state. The operating noise of the movable element is larger in the cover open state than in the cover closed state. Noise more readily echoes late at night than in the daytime, and operating noise sounds large.

As described above, in the conventional printing apparatus, the operating noise of the movable element is larger in the case wherein the cover of the printing apparatus is open than in the case wherein the cover is closed. The operating noise of the movable element sounds larger late at night than in the daytime, and noise must be reduced.

SUMMARY OF THE INVENTION

The present invention has been made to overcome the conventional drawbacks, and has as its object to provide a printing apparatus capable of changing the initialization speed of a movable element on the basis of the open/closed state of a cover and the use time period of the printing apparatus, and reducing mechanical operation noise upon power-on, and a control method therefor.

To solve the above problem and achieve the above object, according to the present invention, a printing apparatus which executes printing operation on a printing medium on the basis of externally acquired printing data comprises initialization processing means for executing initialization processing of a movable element mounted in an apparatus main body, open/closed state detection means for detecting an open/closed state of an opening/closing member for opening/closing the apparatus main body, and switching means for switching a driving speed of the movable element in the initialization processing on the basis of the open/closed state of the opening/closing member.

According to the present invention, a method of controlling a printing apparatus which executes printing operation on a printing medium on the basis of externally acquired printing data comprises an open/closed state detection step of detecting an open/closed state of an opening/closing member for opening/closing an apparatus main body in executing initialization processing of a movable element mounted in the apparatus main body, a switching step of switching a driving speed of the movable element in initialization processing of the movable element mounted in the apparatus main body on the basis of the open/closed state of the opening/closing member, and an initialization step of executing initialization processing of the movable element at the switched driving speed.

According to the present invention, a printing apparatus which executes printing operation on a printing medium on the basis of externally acquired printing data comprises initialization processing means for executing initialization processing of a movable element mounted in an apparatus main body, acquisition means for acquiring time information, and switching means for switching a driving speed of the movable element in the initialization processing on the basis of the acquired time information.

According to the present invention, a method of controlling a printing apparatus which executes printing operation on a printing medium on the basis of externally acquired printing data comprises an acquisition step of acquiring time information in executing initialization processing of a movable element mounted in an apparatus main body, a switching step of switching a driving speed of the movable element in the initialization processing on the basis of the acquired time information, and an initialization step of executing initialization processing of the movable element at the switched driving speed.

According to the present invention, a printing system comprises an external apparatus, and a printing apparatus which is communicably connected to the external apparatus and executes printing operation on a printing medium on the basis of printing data acquired from the external apparatus, wherein the printing apparatus comprises initialization processing means for executing initialization processing of a movable element mounted in an apparatus main body, and the external apparatus comprises open/closed state detection means for detecting an open/closed state of an opening/closing member for opening/closing the main body of the printing apparatus, switching means for switching a driving speed of the movable element in the initialization processing on the basis of the open/closed state of the opening/closing member, and control means for causing the printing apparatus to execute the initialization processing at the driving speed switched by the switching means.

According to another aspect of the present invention, it is preferable that the present invention further comprise acquisition means of acquiring time information, and in the switching means, a driving speed of the movable element in the initialization processing in the open state of the opening/closing member be switched to a speed lower than a driving speed of the movable element in the closed state of the opening/closing member on the basis of the acquired time information.

According to another aspect of the present invention, it is preferable that the present invention further comprise an acquisition step of acquiring time information, and in the switching step, a driving speed of the movable element in the initialization processing in the open state of the opening/closing member be switched to a speed lower than a driving speed of the movable element in the closed state of the opening/closing member on the basis of the acquired time information.

According to still another aspect of the present invention, it is preferable that the printing apparatus be communicably connected to an external apparatus, and in the acquisition means, the time information be acquired from the external apparatus.

According to still another aspect of the present invention, it is preferable that the printing apparatus be communicably connected to an external apparatus, and in the acquisition step, the time information be acquired from the external apparatus.

According to still another aspect of the present invention, it is preferable that in the switching means, the driving speed of the movable element be switched in accordance with which of a plurality of time periods constituting a day contains the acquired time information.

According to still another aspect of the present invention, it is preferable that in the switching step, the driving speed of the movable element be switched in accordance with which of a plurality of time periods constituting a day contains the acquired time information.

According to still another aspect of the present invention, it is preferable that in the switching means, the driving speed of the movable element be switched on the basis of a determination result of which of morning, daytime, and night time periods contains the time information, and when the time information belongs to the morning or daytime time period and the opening/closing member is open, the driving speed of the movable element in the initialization processing be switched to a speed lower than the driving speed of the movable element in the closed state of the opening/closing member.

According to still another aspect of the present invention, it is preferable that in the switching step, the driving speed of the movable element be switched on the basis of a determination result of which of morning, daytime, and night time periods contains the time information, and when the time information belongs to the morning or daytime time period and the opening/closing member is open, the driving speed of the movable element in the initialization processing be switched to a speed lower than the driving speed of the movable element in the closed state of the opening/closing member.

According to still another aspect of the present invention, it is preferable that in the switching means, in the night time period, the driving speed of the movable element in the initialization processing be switched to a speed lower than the driving speed of the movable element in the closed state of the opening/closing member regardless of the open/closed state of the opening/closing member.

According to still another aspect of the present invention, it is preferable that in the switching step, in the night time period, the driving speed of the movable element in the initialization processing be switched to a speed lower than the driving speed of the movable element in the closed state of the opening/closing member regardless of the open/closed state of the opening/closing member.

According to still another aspect of the present invention, it is preferable that in the switching means, when no time information is acquired, the driving speed of the movable element in the initialization processing be switched to a speed lower than the driving speed of the movable element in the closed state of the opening/closing member regardless of the open/closed state of the opening/closing member.

According to still another aspect of the present invention, it is preferable that in the switching step, when no time information is acquired, the driving speed of the movable element in the initialization processing be switched to a speed lower than the driving speed of the movable element in the closed state of the opening/closing member regardless of the open/closed state of the opening/closing member.

According to still another aspect of the present invention, it is preferable that the initialization processing be executed upon powering on the printing apparatus.

According to still another aspect of the present invention, it is preferable that the printing apparatus further comprise, as the movable element, an ink-jet printhead which discharges ink to perform printing, and moving means for relatively moving the printhead and a printing medium.

The present invention can also be applied to the form of a program for causing the printing apparatus or the computer of the external apparatus to execute either of the printing apparatus control methods, or the form of a computer-readable storage medium which stores the program.

As described above, according to the present invention, the cover open/closed state of the printing apparatus and the time period upon power-on are determined. When the cover is open and operating noise is large, or at night when noise sounds large, the driving speed of a movable element such as a line feed motor or carriage motor in initialization is set low. Mechanical operating noise can be reduced, realizing a low-noise printing apparatus.

In another state (the cover is closed or in the morning or daytime), mechanical operating noise does not sound large. The driving speed of the line feed motor or carriage motor in initialization can be increased, realizing high-speed operation.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

A preferred embodiment of the present invention will be described in detail below with reference to the accompanying drawings.

Figure 1:
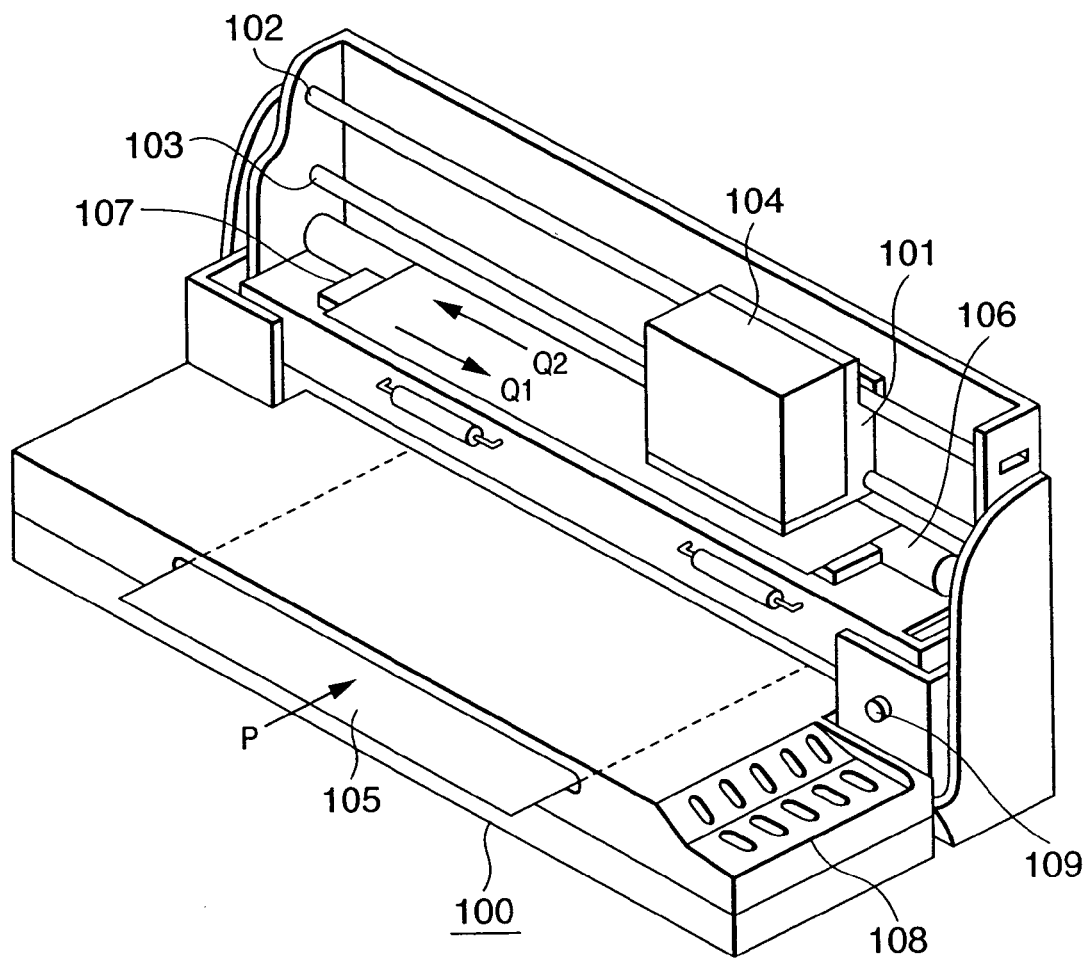
FIG. 1 is a perspective view showing the schematic arrangement of an ink-jet printing apparatus according to an embodiment.

FIG. 1 is a perspective view showing the schematic arrangement of an ink-jet printing apparatus to which the present invention can be applied.

As shown in FIG. 1, a printing medium 105 inserted into the feed position of an ink-jet printing apparatus 100 is fed in a direction indicated by an arrow P by a feed roller 106 which is driven by a line feed motor (not shown), and conveyed to the printable region of an ink-jet printhead 104. A platen 107 is arranged below the printing medium 105 in the printable region.

A carriage 101 detachably supports the printhead 104, and can be moved by two guide shafts 102 and 103 in a direction along them. By driving of the carriage motor (not shown), the carriage 101 reciprocally scans the printhead 104 along directions indicated by arrows Q1 and Q2 as main scanning directions in a scanning region including the printable region.

At the end of one main scanning, a printing medium is conveyed by a predetermined amount in a sub-scanning direction indicated by the arrow P, and waits for the next main scanning. Main scanning and sub-scanning are repeated to print one page.

In FIG. 1, the printhead 104 mounted on the carriage 101 has ink dischargeable orifices and an ink tank which stores ink. The printhead 104 is mounted on the carriage 101 such that the orifices of the printhead 104 discharge ink to the printing medium 105 below the printhead 104 to form an image.

A heating element which generates heat energy in order to discharge ink droplets is arranged near each orifice of the printhead 104. Ink in the nozzle which is rapidly heated by heat generation of the heating element forms bubbles by film boiling. Ink droplets are discharged toward a printing medium by the pressure of bubble formation, forming a character or image.

A printing method using a heating element as an electro-thermal transducer exploits bubbles formed by application of heat energy in discharging ink droplets, and is generally called a bubble-jet printing method. A printing method applicable to the present invention is not limited to the bubble-jet printhead, and may adopt a printhead which discharges ink by using, e.g., a piezoelectric element.

Reference numeral 108 denotes a switch & display unit. The switch unit is used to power on/off the printing apparatus and set various printing modes. The display unit 108 can display the operation state of the printing apparatus 100. Reference numeral 109 denotes a cover switch which is turned off when the cover is opened and turned on when the cover is closed.

Figure 2:
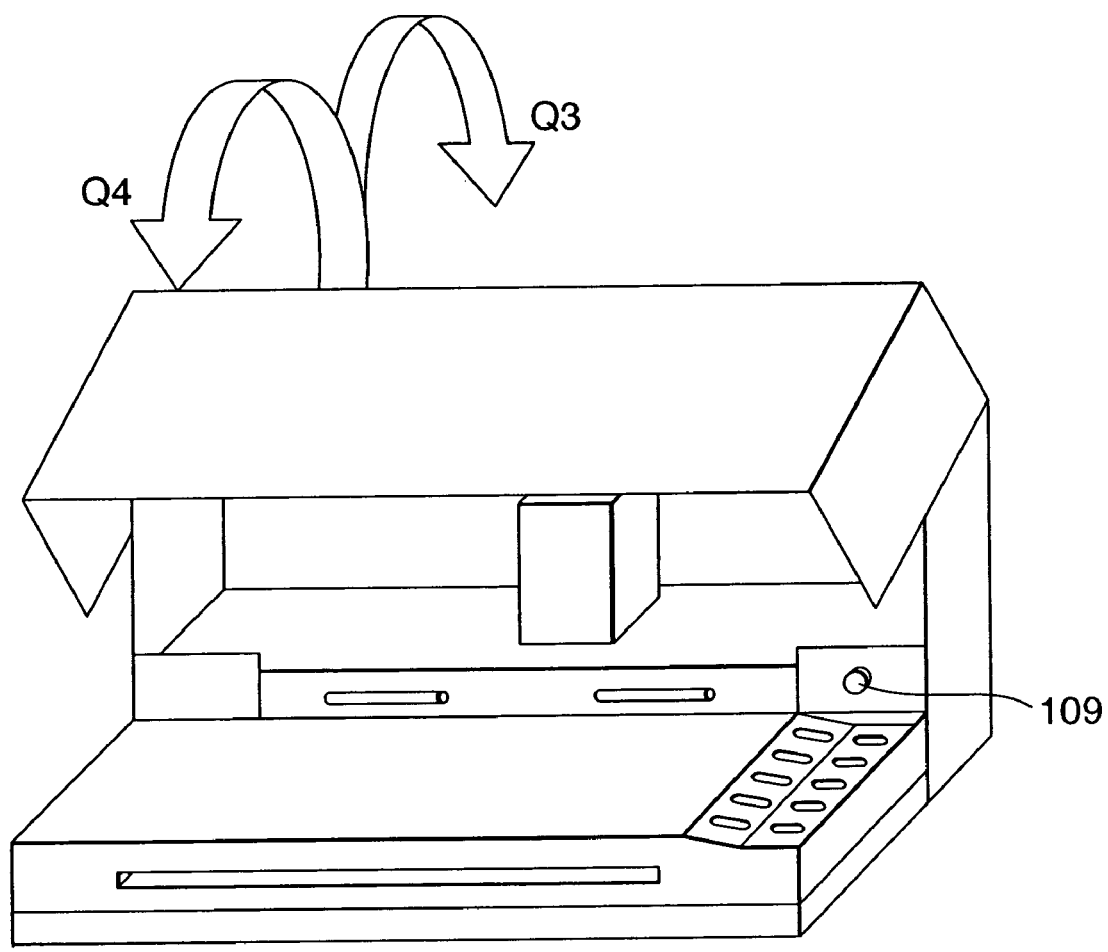
FIG. 2 is a view showing cover opening/closing operation of the ink-jet printing apparatus according to the embodiment.

FIG. 2 is a view showing cover opening/closing operation of the ink-jet printing apparatus.

In FIG. 2, when the cover is opened in a direction indicated by an arrow Q3, the cover is open, and the cover switch 109 is turned off to detect the cover open state. When the cover is closed in a direction indicated by an arrow Q4, the cover is closed, and the cover switch 109 is turned on to detect the cover closed state.

Figure 3:
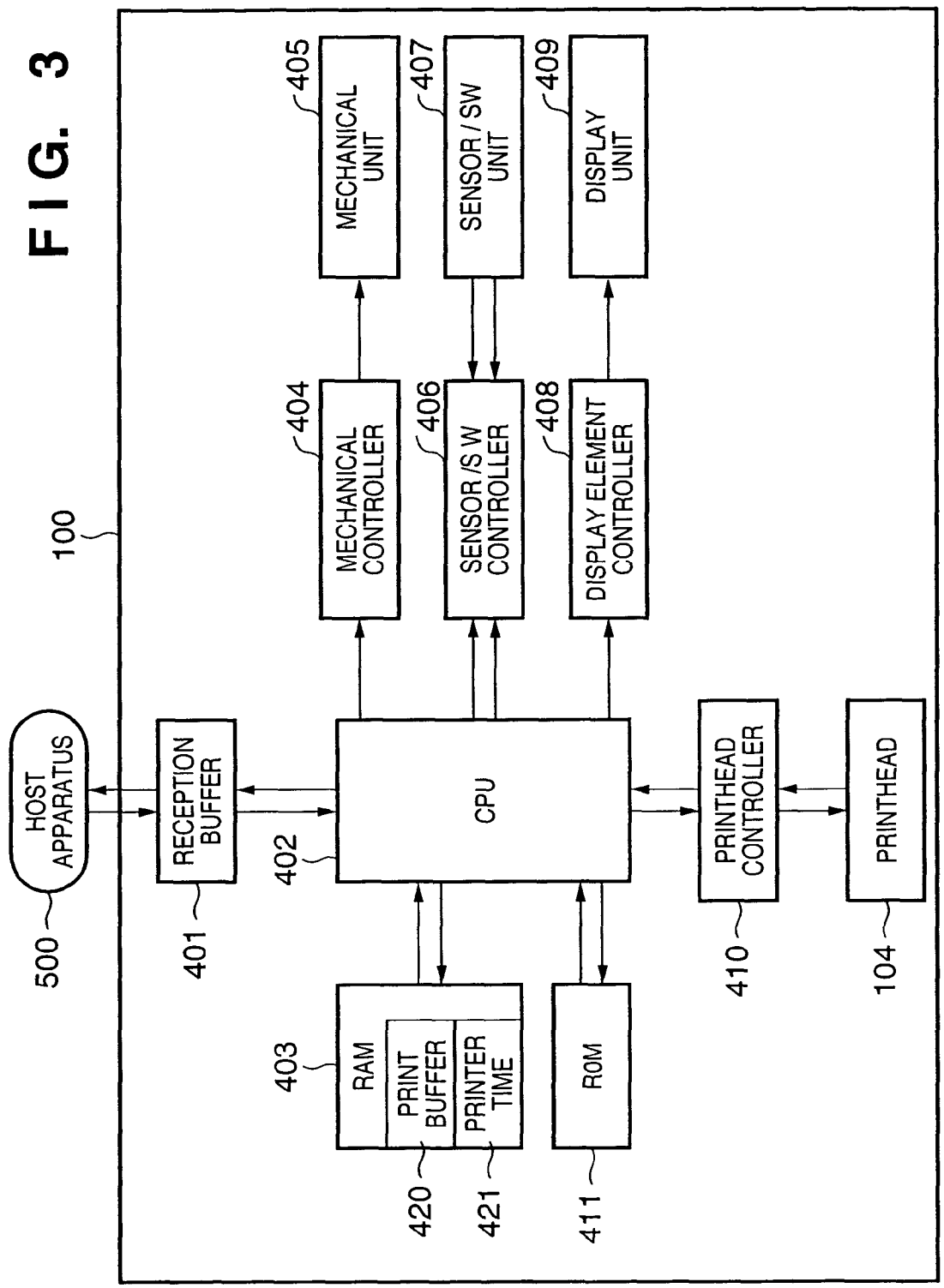
FIG. 3 is a control block diagram showing the ink-jet printing apparatus according to the embodiment.

FIG. 3 is a control block diagram showing the main part of the ink-jet printing apparatus to which the present invention can be applied.

In FIG. 3, the printing apparatus 100 is communicably connected to a host apparatus 500 such as an external computer. Character or image data to be printed is transmitted from the host apparatus 500 to the printing apparatus 100, and stored in a reception buffer 401. Data for confirming whether data is correctly transferred and data which represents the operation state of the printing apparatus 100 are transmitted from the printing apparatus 100 to the host apparatus 500.

Data stored in the reception buffer 401 is processed into data used for printing upon main scanning of the printhead 104 under the management of a CPU 402. The resultant data is stored in a print buffer 420 in a RAM (Random Access Memory) 403.

Data in the print buffer 420 is transferred to the printhead 104 by a printhead controller 410. The printhead 104 is controlled to print character or image data.

The printhead controller 410 detects, e.g., temperature information representing the state of the printhead 104, and sends the information to the CPU 402. The information is transmitted to the printhead controller 410 to drive and control ink discharge of the printhead 104.

A mechanical controller 404 drives and controls a mechanical unit (movable element) 405 such as a carriage motor or line feed motor upon reception of a command from the CPU 402.

A sensor/SW controller 406 supplies to the CPU 402 a signal from a sensor/SW unit 407 which comprises various sensors and SWs (switches).

In response to a command from the CPU 402, a display element controller 408 controls a display unit 409 which is formed from the LEDs and liquid crystal elements of display panels, and the like.

Initialization processing (operation) of the printing apparatus according to the embodiment will be explained in detail with reference to the flow charts of FIGS. 4 to 6.

Figure 4:
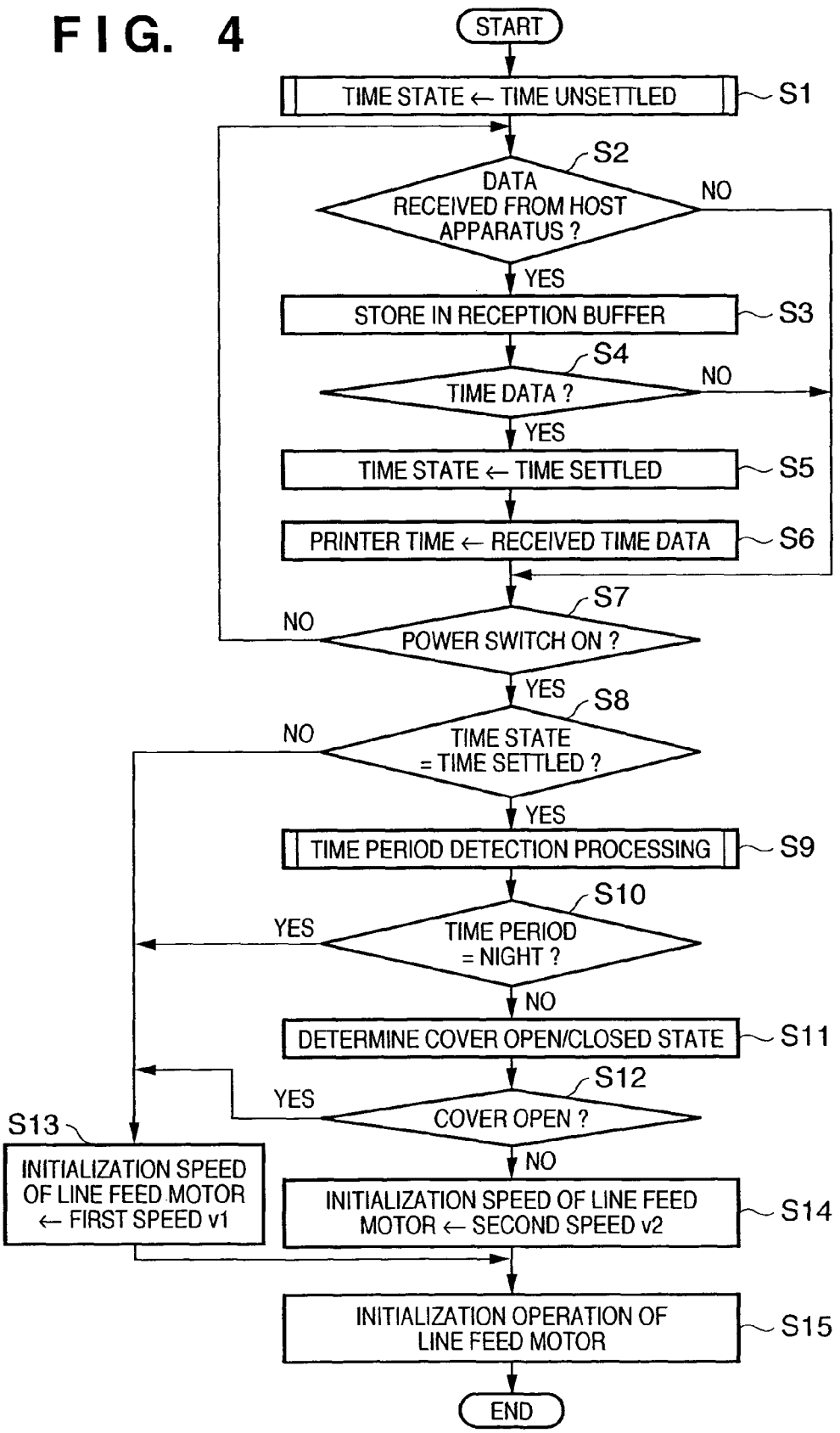
FIG. 4 is a flow chart showing initialization processing of the ink-jet printing apparatus according to the embodiment.
Figure 5:
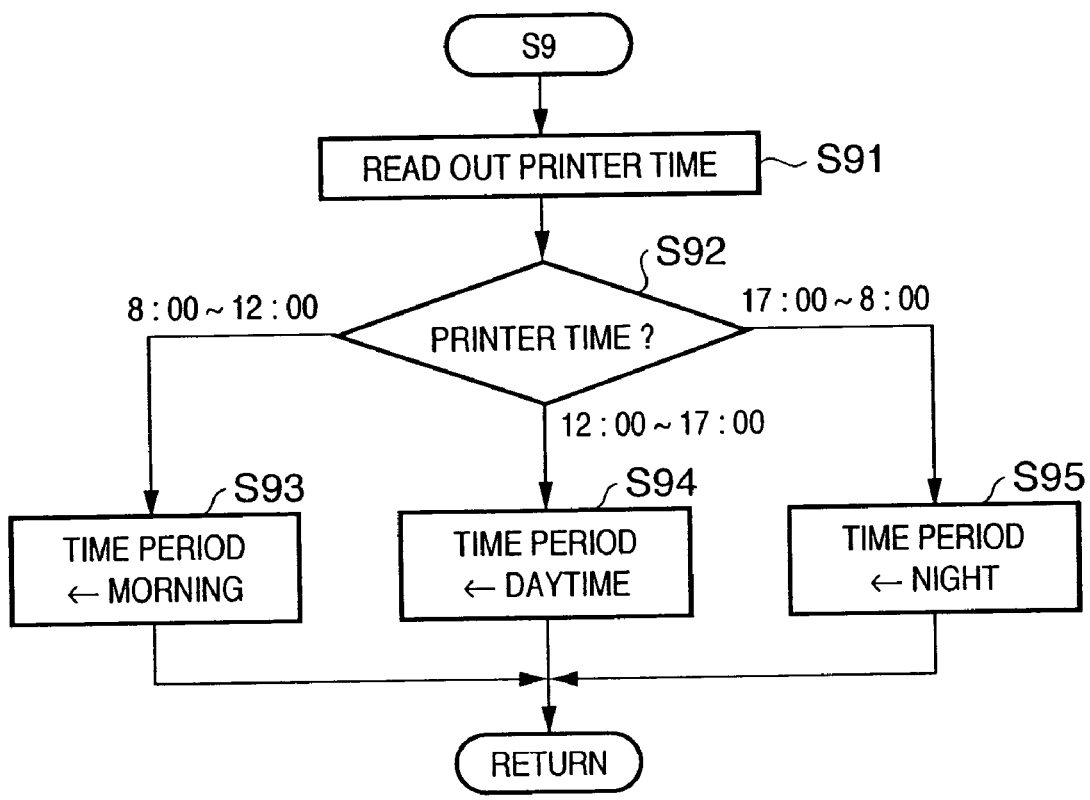
FIG. 5 is a flow chart showing time period detection processing in step S9 of FIG. 4.
Figure 6:
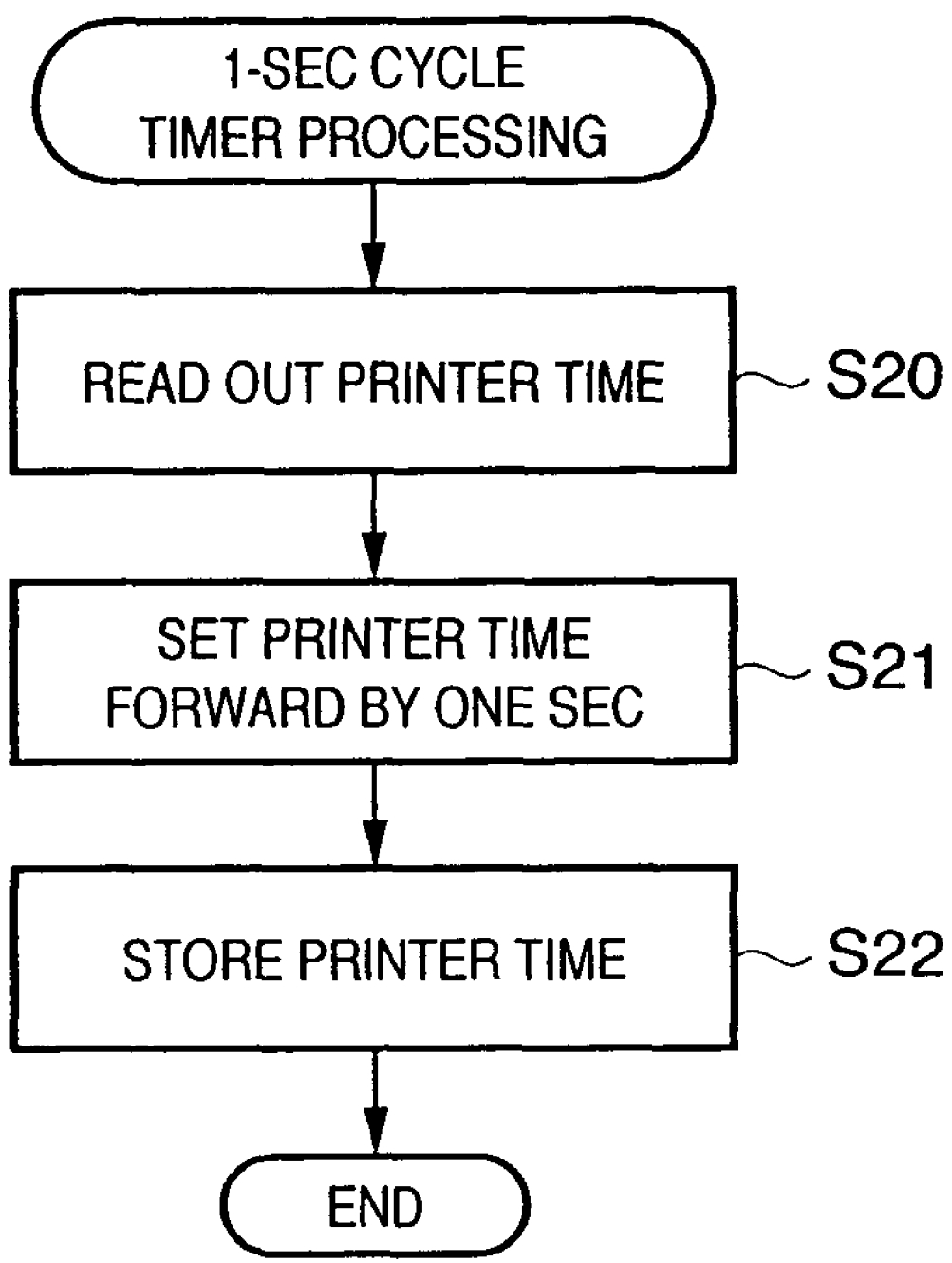
FIG. 6 is a flow chart showing update processing of the printer time by a 1-sec cycle timer in the ink-jet printing apparatus according to the embodiment.

FIGS. 4 to 6 are flow charts for explaining initialization operation of the line feed motor upon power-on in the ink-jet printing apparatus 100 according to the embodiment. A program which executes this processing is realized when the CPU (Central Processing Unit) 402 executes a program stored in a ROM (Read Only Memory) 411. The following initialization operation is not limited to the line feed motor, and can also be applied to a carriage motor or another movable element.

Referring to FIG. 4, in step S1, the time state is determined to be time unsettled in order to manage whether time data has been received from the host apparatus 500.

The flow waits for reception of time data from the host apparatus 500 or press (ON) of the power switch 108 by the user.

If time data from the host apparatus 500 is received, data is determined in step S2 to have been received from the host apparatus. The flow advances to step S3 to store the received data in the reception buffer 401.

If the received data is time data in step S4, the flow advances to step S5 to set the time state to time settled, and display reception of the time data from the host apparatus.

The flow advances to step S6 to set the time data received from the host apparatus as printer time and store the printer time in a RAM area 421. The stored printer time is updated by 1-sec cycle timer processing shown in FIG. 6 (processing in FIG. 6 will be explained in detail later).

The flow advances to step S7, and if the user does not press (turn on) the power switch, to step S2 to repeat the above processing.

If the user presses (turns on) the power switch, the flow advances to step S8 to select the driving speed (initialization speed) of the line feed motor in initialization operation (select either a high speed or low speed).

In the course of the description of FIG. 4, processing in FIG. 6 will be explained.

FIG. 6 shows printer time update processing by a 1-sec cycle timer. In step S20, the printer time stored in the RAM area 421 is read out. The flow advances to step S21 to set the printer time forward by one sec. The flow advances to step S22 to store the printer time in the RAM area 421. In this manner, the printer time is managed.

Referring back to FIG. 4, processes in step S8 and subsequent steps will be described.

In step S8, whether the time data has been received from the host apparatus is determined. If NO in step S8, the time period upon power-on is unknown. The flow advances to step S13 to set the initialization speed of the line feed motor to a first speed v1, and to step S15 to execute initialization operation of the line feed motor at the first speed.

If YES in step S8, the flow advances to step S9 to detect the current time period. time period in step S9 in detail. In step S91, the printer time is read out from the RAM area 421 in order to refer to the printer time.

The flow advances to step S92 to perform determination for classifying the readout printer time into three states (morning, daytime, and night). If the printer time falls within 8:00 to 12:00, the flow advances to step S93 to set the time period as morning. If the printer time falls within 12:00 to 17:00, the flow advances to step S94 to set the time period as daytime. If the printer time falls within 17:00 to 8:00, the flow advances to step S95 to set the time period as night.

At the end of time period determination, the flow escapes from detection processing in FIG. 5, and advances to step S10 in FIG. 4.

In step S10, the initialization speed of the line feed motor is selected (either a high speed or low speed is selected) depending on the time period upon power-on.

If the time period is night, the flow advances to step S13 to set the initialization speed of the line feed motor to the first speed v1, and to step S15 to execute initialization operation of the line feed motor at the first speed v1.

If the time period is morning or daytime, the flow advances to steps S11 and S12 to determine the cover open/closed state from the cover switch 109. If the cover is open, the flow advances to step S13 to set the initialization speed of the line feed motor to the first speed v1. If the cover is closed, the flow advances to step S14 to set the initialization speed of the line feed motor to a second speed v2 which is higher than the first speed v1 (v1<v2).

In step S15, initialization operation of the line feed motor is executed at the set initialization speed.

According to the embodiment, the initialization speed of a movable element such as a line feed motor or carriage motor can be selected on the basis of the cover open/closed state of the printing apparatus and the use time of the printing apparatus. In the use of the printing apparatus when the cover is open and operating noise is large or during a time period such as late at night when noise sounds large, the operating speed of the movable element in initialization upon power-on can be suppressed to reduce noise.

Under another condition, the operating speed in initialization upon power-on need not be suppressed (operating noise is not large). Hence, the operating speed in initialization can be increased to achieve high-speed initialization operation.

In the above embodiment, processes shown in FIGS. 4 to 6 are functions executed by the ink-jet printing apparatus. For example, in a printing system in which a host computer serving as an external apparatus and a printing apparatus are communicably connected, the printing apparatus may execute only initialization processing. The external apparatus may determine whether to switch the driving speed of a movable element in initialization processing on the basis of the open/closed state of the cover or the time period when initialization processing is executed, switch the driving speed of the movable element in initialization processing, and transmit a command from the host to the printing apparatus so as to cause the printing apparatus to execute initialization processing at the switched/set driving speed.

In the above embodiment, droplets discharged from the printhead are ink, and a liquid contained in the ink tank is ink. The content of the ink tank is not limited to ink. For example, the ink tank may contain a processing solution to be discharged onto a printing medium in order to increase the fixing properties, water resistance, or quality of a printed image.

Of ink-jet printing systems, the embodiment can adopt a system which comprises a means (e.g., an electrothermal transducer or laser beam) for generating heat energy as energy utilized to discharge ink and changes the ink state by heat energy. This ink-jet printing system can increase the printing density and resolution.

As a representative arrangement or principle, the present invention preferably adopts the basic principle disclosed in, e.g., U.S. Pat. Nos. 4,723,129 or 4,740,796. This system is applicable to both a so-called on-demand apparatus and continuous apparatus. The system is particularly effective for the on-demand apparatus because of the following reason. At least one driving signal which corresponds to printing information and gives a rapid temperature rise exceeding nuclear boiling is applied to an electrothermal transducer arranged in correspondence with a sheet or liquid channel holding a liquid (ink). This signal causes the electrothermal transducer to generate heat energy, and causes film boiling on the heat effecting surface of the printhead. Consequently, a bubble can be formed in the liquid (ink) in one-to-one correspondence with the driving signal. Growth and shrinkage of the bubble discharge the liquid (ink) from an orifice, forming at least one droplet. The driving signal more preferably has a pulse shape because a bubble grows and shrinks instantaneously at an appropriate timing to achieve discharge of the liquid (ink) with high response.

The pulse-like driving signal is preferably a signal disclosed in U.S. Pat. Nos. 4,463,359 or 4,345,262. Conditions disclosed in U.S. Pat. No. 4,313,124 which is an invention concerning the temperature rise ratio of the heat effecting surface can provide higher-quality printing.

The printhead structure can be a combination (linear liquid channel or right-angle liquid channel) of orifices, liquid channels, and electrothermal transducers as disclosed in each reference. The present invention also includes structures disclosed in U.S. Pat. Nos. 4,558,333 and 4,459,600 in which the heat effecting surface is arranged in a bent region. The present invention may also employ a structure based on Japanese Patent Laid-Open No. 59-123670 in which a slot common to a plurality of electrothermal transducers is used as the discharge portion of the electrothermal transducers, and a structure based on Japanese Patent Laid-Open No. 59-138461 in which an opening for absorbing the pressure wave of heat energy is made to correspond to the discharge portion.

A full line type printhead having a length corresponding to the width of the largest printing medium printable by the printing apparatus can take a structure which meets this length by a combination of printheads as disclosed in the above-mentioned specifications, or a single integrated printhead structure.

It is also possible to employ a cartridge type printhead described in the embodiment in which an ink tank is integrated with a printhead itself, or an interchangeable chip type printhead which can be electrically connected to an apparatus main body and receive ink from the apparatus main body when attached to the apparatus main body.

It is preferable to add a printhead recovery means or preliminary means to the printing apparatus because printing operation can further stabilize. Practical examples of the additional means are a capping means for the printhead, a cleaning means, a pressurizing or suction means, an electrothermal transducer, another heating element, and a preliminary heating means as a combination of the electrothermal transducer and heating element. A predischarge mode in which discharge is performed independently of printing is also effective for stable printing.

The printing mode of the printing apparatus is not limited to a printing mode using only a main color such as black. The apparatus can adopt at least either a composite color mode using different colors or a full color mode using a color mixture, regardless of whether the printhead is an integral printhead or a combination of printheads.

The above-described embodiment assumes that ink is a liquid. It is also possible to use ink which solidifies at room temperature or less and softens or liquefies at room temperature. A general inkjet system performs temperature control such that the viscosity of ink falls within a stable discharge range by adjusting the ink temperature within the range of 30° C. (inclusive) to 70° C. (inclusive). Hence, ink need only liquefy when a printing signal used is applied to it.

In order to prevent a temperature rise caused by heat energy by positively using the temperature rise as energy of the state change from the solid state to the liquid state of ink, or to prevent evaporation of ink, ink which solidifies when left to stand and liquefies when heated can be used. In any case, the present invention is applicable to any ink which liquefies only when heat energy is applied, such as ink which liquefies when applied with heat energy corresponding to a printing signal and is discharged as liquid ink, or ink which already starts to solidify when arriving at a printing medium. As described in Japanese Patent Laid-Open No. 54-56847 or 60-71260, this type of ink can be held as a liquid or solid in a recess or through hole in a porous sheet and opposed to an electrothermal transducer in this state. In the present invention, executing the aforementioned film boiling method is most effective for each ink described above.

Furthermore, the printing apparatus according to the present invention can take the form of any of an integrated or separate image output terminal of an information processing apparatus such as a computer, a copying apparatus combined with a reader or the like, and a facsimile apparatus having a transmission/reception function.

Other Embodiment

The present invention can be applied to a system constituted by a plurality of devices (e.g., a host computer, interface, reader, and printer) or to an apparatus (e.g., a copying machine or facsimile apparatus) comprising a single device.

The object of the present invention is also achieved when a storage medium (or recording medium) which stores software program codes for realizing the functions of the above-described embodiment is supplied to a system or apparatus, and the computer (or the CPU or MPU) of the system or apparatus reads out and executes the program codes stored in the storage medium. In this case, the program codes read out from the storage medium realize the functions of the above-described embodiment, and the storage medium which stores the program codes constitutes the present invention. The functions of the above-described embodiment are realized when the computer executes the readout program codes. Also, the functions of the above-described embodiment are realized when an OS (Operating System) or the like running on the computer performs part or all of actual processing on the basis of the instructions of the program codes.

The functions of the above-described embodiment are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

When the present invention is applied to the storage medium, the storage medium stores program codes corresponding to the flow charts shown in FIGS. 4 to 6 and various tables.

The present invention is not limited to the above embodiments and various changes and modifications can be made within the spirit and scope of the present invention. Therefore, to apprise the public of the scope of the present invention, the following claims are made.

What is claimed is:

1. A printing apparatus which executes a printing operation of printing on a printing medium on the basis of externally acquired printing data, comprising:
    initialization processing means for executing initialization processing of a movable element mounted in an apparatus main body upon powering on the printing apparatus;
    acquisition means for acquiring time information;
    determination means for determining if the acquired time information belongs to a morning time period, a daytime period, or a nighttime period;
    open/closed state detection means for detecting whether an opening/closing member for exposing/concealing the movable element is in an open state or a closed state when the initialization processing is executed by said initialization processing means, wherein the movable element is drivable to be moved when the opening/closing member is open and when the opening/closing member is closed; and
    setting means for setting a driving speed of the movable element on a basis of the acquired time information and a state of the opening/closing member when the initialization processing is executed,
    wherein if the determination means determines that the time information belongs to a time period other than the nighttime period, said setting means sets the driving speed of the movable element to a first driving speed, when the opening/closing member is in the open state, which is lower than a second driving speed of the movable element when the opening/closing member is in the closed state, and
    if the determination means determines that the time information belongs to the nighttime period, said setting means sets the driving speed of the movable element to the first driving speed regardless of the state of the opening/closing member.

2. The apparatus according to claim 1,
    wherein the printing apparatus is communicably connected to a host apparatus, and said acquisition means acquires the time information from the host apparatus.

3. The apparatus according to claim 1, further comprising,
    as the movable element, an ink-jet printhead which discharges ink to perform printing on the printing medium; and
    moving means for relatively moving said printhead and the printing medium.

4. A computer-implemented method of controlling a printing apparatus which executes a printing operation of printing on a printing medium on the basis of externally acquired printing data, comprising:
    an open/closed state detection step of detecting whether an opening/closing member for exposing/concealing a movable element mounted in the apparatus main body is in an open state or a closed state in executing initialization processing of the movable element upon powering on the printing apparatus, wherein the movable element is drivable to be moved when the opening/closing member is open and when the opening/closing member is closed;
    an acquisition step of acquiring time information;
    determination means for determining if the acquired time information belongs to a morning time period, a daytime period, or a nighttime period;
    a setting step of setting a driving speed of the movable element on a basis of the acquired time information and a state of the opening/closing member when an initialization process is executed, wherein, if in the determination step it is determined that the time information belongs to a time period other than the nighttime period, in the setting step, the driving speed of the movable element in the initialization process is set to a first driving speed, when the opening/closing member is in the open state, which is lower than a second driving speed of the movable element when the opening/closing member is in the closed state, and if it is determined in the determination step that the time information belongs to the nighttime period, in the setting step, the driving speed of the movable element is set to the first driving speed regardless of the state of the opening/closing member; and an initialization step of executing the initialization processing of the movable element according to the set driving speed, wherein said steps are performed by a computer.

5. A printing system comprising a host apparatus, and a printing apparatus which is communicably connected to said host apparatus and executes a printing operation of printing on a printing medium on the basis of printing data acquired from said host apparatus, wherein said printing apparatus comprises:

initialization processing means for executing initialization processing for a movable element mounted in a main body of said printing apparatus upon powering on the printing apparatus; and acquisition means for acquiring time information;

determination means for determining if the acquired time information belongs to a morning time period, a daytime period, or a nighttime period;

wherein said host apparatus comprises:

open/closed state detection means for detecting whether an opening/closing member for exposing/concealing the movable element is in an open state or a closed state when said printing apparatus executes the initialization processing by said initialization processing means, wherein the movable element is drivable to be moved when the opening/closing member is open and when the opening/closing member is closed;

setting means for setting a driving speed of the movable element on the basis of the acquired time information and a state of the opening/closing member when the initialization processing is executed, wherein if the determination means determines that the time information belongs to a time period other than the nighttime period, said setting means sets the driving speed of the movable element to a first driving speed, when the opening/closing member is in the open state, which is lower than a second driving speed of the movable element when the opening/closing member is in the closed state, and if the determination means determines that the time information belongs to the nighttime period, said setting means sets the driving speed of the movable element to the first driving speed regardless of the state of the opening/closing member; and control means for causing said printing apparatus to execute the initialization processing according to the driving speed set by the setting means.

6. The system according to claim 5, wherein the acquisition means acquires the time information from the host apparatus.

7. The system according to claim 5, wherein said printing apparatus further comprises, as the movable element, an ink jet printhead which discharges ink to perform printing on the printing medium; and moving means for relatively moving said printhead and the printing medium.

* * * * *